(12) United States Patent
Shibata et al.

(10) Patent No.: US 12,020,252 B2
(45) Date of Patent: Jun. 25, 2024

(54) ACCOUNTING SYSTEM, ACCOUNTING PROCESSING METHOD, AND RECORDING MEDIUM

(71) Applicant: NEC Corporation, Tokyo (JP)

(72) Inventors: Takashi Shibata, Tokyo (JP); Shoji Yachida, Tokyo (JP); Chisato Funayama, Tokyo (JP); Masato Tsukada, Tokyo (JP); Yuka Ogino, Tokyo (JP); Keiichi Chono, Tokyo (JP); Emi Kitagawa, Tokyo (JP); Yasuhiko Yoshida, Tokyo (JP); Yusuke Mori, Tokyo (JP); Toru Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 17/281,323

(22) PCT Filed: Oct. 5, 2018

(86) PCT No.: PCT/JP2018/037332
§ 371 (c)(1),
(2) Date: Mar. 30, 2021

(87) PCT Pub. No.: WO2020/070870
PCT Pub. Date: Apr. 9, 2020

(65) Prior Publication Data
US 2021/0406903 A1 Dec. 30, 2021

(51) Int. Cl.
*G06Q 20/40* (2012.01)
*G06K 19/06* (2006.01)
(Continued)

(52) U.S. Cl.
CPC . *G06Q 20/40145* (2013.01); *G06K 19/06028* (2013.01); *G06K 19/06037* (2013.01);
(Continued)

(58) Field of Classification Search
None
See application file for complete search history.

(56) References Cited

U.S. PATENT DOCUMENTS

2007/0284432 A1* 12/2007 Abouyounes .......... G06Q 20/04
235/379
2010/0046808 A1 2/2010 Connell et al.
(Continued)

FOREIGN PATENT DOCUMENTS

JP 2001-086319 A 3/2001
JP 2002-007933 A 1/2002
(Continued)

OTHER PUBLICATIONS

Kaziyeva, Nazym, Georgy Kukharev, and Yuri Matveev. "Barcoding in biometrics and its development." Computer Vision and Graphics: International Conference, ICCVG 2018, Warsaw, Poland, Sep. 17-19, 2018, Proceedings. Springer International Publishing (Year: 2018).*

(Continued)

*Primary Examiner* — Daniel S Felten
*Assistant Examiner* — Claire A Rutiser
(74) *Attorney, Agent, or Firm* — Sughrue Mion, PLLC

(57) ABSTRACT

An accounting system according to the present invention include: an information display device including a first memory; and at least one first processor coupled to the first memory. The first processor performs first operations. The first operations includes: causing a first camera to image a person, and causes a display to display a code based on physical characteristics peculiar to the imaged person. An information processing device includes a second memory; and at least one second processor coupled to the second memory. The second processor performs second operations. The second operations includes: causing a second camera to image the code displayed by the information display device, (Continued)

acquiring accounting information of the person using the imaged code, and executing accounting processing using the accounting information.

13 Claims, 8 Drawing Sheets

(51) Int. Cl.
  *G06Q 40/02* (2023.01)
  *G06V 40/19* (2022.01)
  *G07C 9/37* (2020.01)
  *G07C 9/38* (2020.01)
  *H04N 23/90* (2023.01)

(52) U.S. Cl.
  CPC ....... *G06K 19/06112* (2013.01); *G06Q 40/02* (2013.01); *G06V 40/19* (2022.01); *G07C 9/37* (2020.01); *G07C 9/38* (2020.01); *H04N 23/90* (2023.01)

(56) References Cited

U.S. PATENT DOCUMENTS

| | | | | |
|---|---|---|---|---|
| 2013/0332439 | A1* | 12/2013 | Hope | G06F 16/955 707/706 |
| 2015/0254508 | A1 | 9/2015 | Kimura et al. | |
| 2016/0189162 | A1 | 6/2016 | Taira et al. | |
| 2018/0336332 | A1* | 11/2018 | Singh | H04W 12/065 |
| 2019/0378115 | A1* | 12/2019 | Hamilton | G06Q 20/3274 |

FOREIGN PATENT DOCUMENTS

| | | |
|---|---|---|
| JP | 2002-015258 A | 1/2002 |
| JP | 2004-030176 A | 1/2004 |
| JP | 2004-152046 A | 5/2004 |
| JP | 2004-227134 A | 8/2004 |
| JP | 2007-304742 A | 11/2007 |
| JP | 2014-174707 A | 9/2014 |
| JP | 2015-055952 A | 3/2015 |
| JP | 2015-170099 A | 9/2015 |
| JP | 2016-126749 A | 7/2016 |
| JP | 2018-041181 A | 3/2018 |
| JP | 2018-101420 A | 6/2018 |

OTHER PUBLICATIONS

Grother, P., Salamon, W., & Chandramouli, R. (2013). Biometric specifications for personal identity verification. NIST Special Publication, 800, 76-2. (Year: 2013).*
International Search Report for PCT Application No. PCT/JP2018/037332, dated Dec. 18, 2018.
English translation of Written opinion for PCT Application No. PCT/JP2018/037332, dated Dec. 18, 2018.
JP Office Action for JP Application No. 2020-551047, dated Nov. 8, 2022.
Japanese Office Communication for JP Application No. 2020-551047 dated Jan. 24, 2023 with English Translation.
JP Office Communication for JP Application No. 2022-197572, dated Dec. 12, 2023 with English Translation.
NEC wins first place in iris recognition accuracy evaluation by US national agency - Accelerating safety business with biometric authentication "Bio-IDiom" as the core—, Press Release NEC, Japan, Apr. 27, 2018, https://jpn.nec.com/press/201804/20180427_02.html.

* cited by examiner

ACCOUNTING SYSTEM, ACCOUNTING PROCESSING METHOD, AND RECORDING MEDIUM

This application is a National Stage Entry of PCT/JP2018/037332 filed on Oct. 5, 2018, the contents of all of which are incorporated herein by reference, in their entirety.

TECHNICAL FIELD

The present invention relates to an accounting system, and particularly, to an accounting system using biometric authentication.

BACKGROUND ART

In addition to money, electronic data such as credit cards is used to pay for a product and/or a service. When the electronic data is used, identity authentication is performed to avoid the use by an unauthorized person or the like.

When a person enters a country at an airport or a data center, identity authentication is performed at the time of entering the facility.

As the identity authentication, authentication using information related to physical characteristics of an individual (biometrics information) is used (for example, refer to Patent Literatures (PTLs) 1 to 3).

The physical characteristics used as the biometric information are desirably characteristics that does not largely change for a long time and is difficult to forge by others. For example, as the physical characteristics, a fingerprint, a blood vessel, or an iris is used.

A personal authentication settlement system described in PTL 1 makes settlement using an iris.

A car wallet settlement system described in PTL 2 authenticates a customer on a vehicle using biometric authentication and executes settlement processing or the like when the customer leaves the place by the vehicle.

An information processing system described in PTL 3 executes settlement processing using a face image of a visitor.

CITATION LIST

Patent Literature

[PTL 1] JP 2018-101420 A
[PTL 2] JP 2004-227134 A
[PTL 3] JP 2018-041181 A

SUMMARY OF INVENTION

Technical Problem

The biometric information is information that can identify an individual and one of pieces of sensitive information (sensitive information) that requires careful handling. It is desirable that the number of times of provision of the biometric information be smaller. For example, a user has a large psychological load with respect to the plurality of number of times of provision of the biometric information.

Processing using the biometric information such as an iris image is processing using a large number of pixels and is processing with a heavy load. Therefore, it is desirable that the number of times of processing using the biometric information be smaller.

However, the personal authentication settlement system described in PTL 1 needs iris authentication for each settlement.

PTL 2 acquires biometric information data by each shop terminal.

The information processing system described in PTL 3 needs to acquire the face image of the visitor a plurality of times (at least, when entering shop and at the time of payment).

In this way, the inventions described in PTLs 1 to 3 have had a problem that it is necessary to acquire the biometric information a plurality of times.

An object of the present invention is to solve the above issues and to provide an accounting system or the like that reduces the number of times of provision of information regarding physical characteristics.

Solution to Problem

An accounting system according to one aspect of the present invention includes;
an information display device including
a first memory; and
at least one first processor coupled to the first memory,
the first processor performing first operations, the first operations including:
causing a first camera to image a person, and
causing a display to display a code based on physical characteristics peculiar to the imaged person; and
an information processing device including
a second memory; and
at least one second processor coupled to the second memory,
the second processor performing second operations, the second operations including:
causing a second camera to image the code displayed by the information display device,
acquiring accounting information of the person by using the imaged code, and
executing accounting processing by using the accounting information.

An information display device according to one aspect of the present invention includes:
a memory; and
at least one processor coupled to the memory,
the processor performing operations, the operations includes:
causing a first camera to image a person, and
causing a display to display a code based on physical characteristics peculiar to the imaged person as the code to be imaged by an information processing device that
causes a second camera to image the code,
acquires accounting information of the person by using the imaged code, and
executes accounting processing by using the accounting information.

An information processing device according to one aspect of the present invention includes:
a memory; and
at least one processor coupled to the memory,
the processor performing operations, the operations includes:
causing a second camera to image a code displayed by an information display device that causes a first camera to image a person and causes a display to display the code based on physical characteristics peculiar to the imaged person;

acquiring accounting information of the person by using the imaged code; and executing accounting processing by using the accounting information.

An accounting processing method according to one aspect of the present invention includes:

in an accounting system, by an information display device, causing a first camera to image a person and causing a display to display a code based on physical characteristics peculiar to the imaged person; and by an information processing device, causing a second camera to image the code displayed by the information display device, acquiring accounting information of the person by using the imaged code, and executing accounting processing by using the accounting information.

An accounting processing method according to a second aspect of the present invention includes:

by an information display device, causing a first camera to image a person; and causing a display to display the code based on physical characteristics peculiar to the imaged person as the code to be imaged by an information processing device that causes a second camera to image the code, acquires accounting information of the person by using the imaged code, and executes accounting processing by using the accounting information.

An accounting processing method according to a third aspect of the present invention includes:

by an information processing device, causing a second camera to image a code displayed by an information display device that causes a first camera to image a person and causes a display to display the code based on physical characteristics peculiar to the imaged person;

acquiring accounting information of the person by using the imaged code; and executing accounting processing by using the accounting information.

A non-transitory computer-readable recording medium according to one aspect of the present invention that embodies a programme the program causing an information display device to perform a method, the method including:

causing a first camera to image a person; and causing a display to display a code based on physical characteristics peculiar to the imaged person as the code to be imaged by an information processing device that causes a second camera to image the code, acquires accounting information of the person by using the imaged code, and executes accounting processing by using the accounting information.

A non-transitory computer-readable recording medium according to a second aspect of the present invention that embodies a program, the program causing an information processing device to perform a method, the method including:

causing a second camera to image a code displayed by an information display device that causes a first camera to image a person and causes a display to display the code based on physical characteristics peculiar to the imaged person;

acquiring accounting information of the person by using the imaged code, and accounting by using the accounting information.

Advantageous Effects of Invention

According to the present invention, it is possible to reduce the number of times of provision of information regarding physical characteristics.

Example Embodiment

Figure 1:
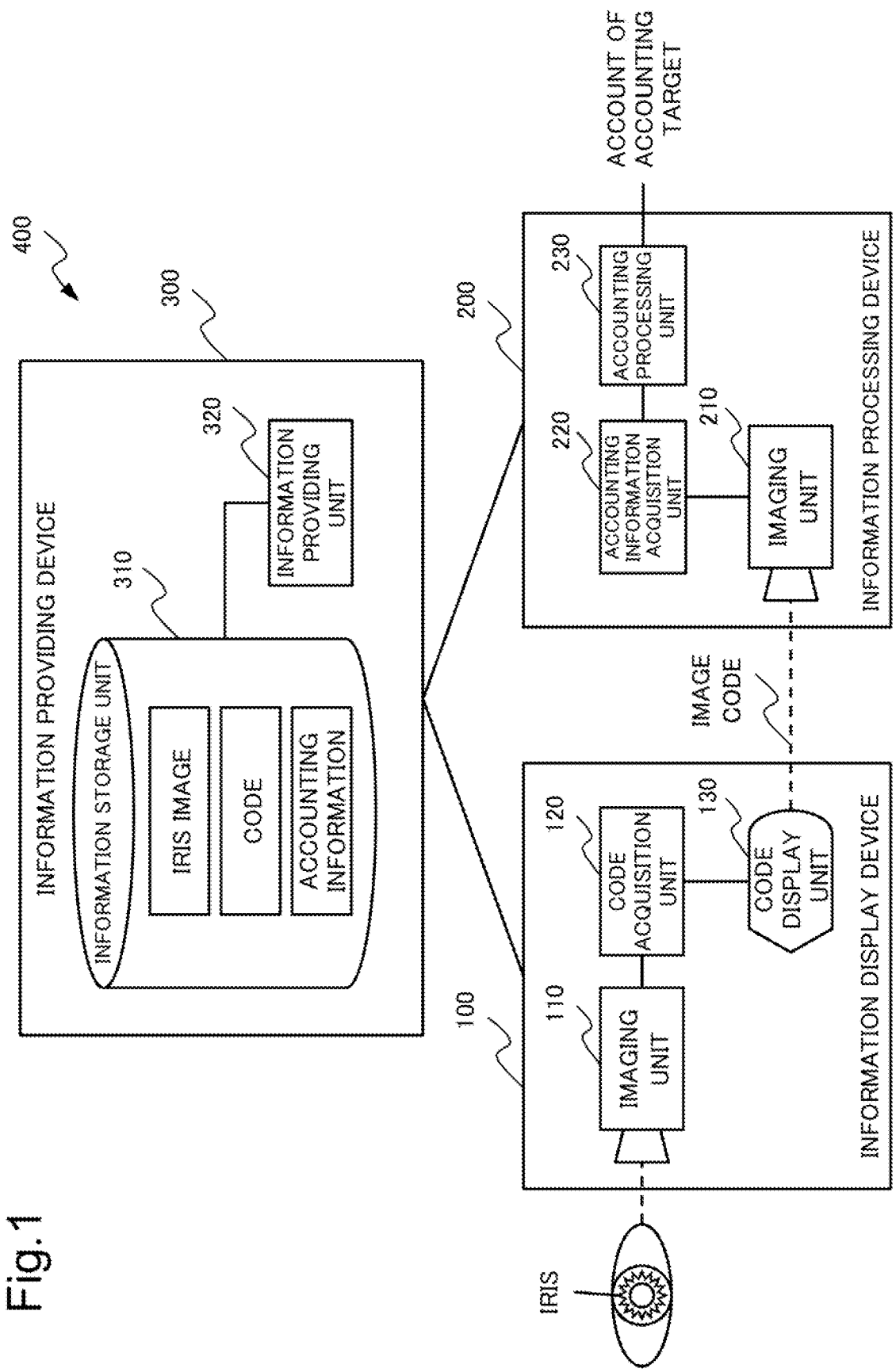
FIG. 1 is a block diagram illustrating an example of a configuration of an accounting system according to a first example embodiment.

Next, example embodiments of the present invention will be described with reference to the drawings.

Each drawing is used to explain each example embodiment. However, each example embodiment is not limited to illustration of each drawing. The similar components in the drawings are denoted with the same numeral, and the repetitive description thereof may be omitted. In the drawings to be used in the following description, description and illustration of a configuration of a part that is not related to the description of each example embodiment may be omitted.

Physical characteristics peculiar to an individual (hereinafter, "biometrics") used in each example embodiment are not limited. For example, the biometrics is fingerprints, blood vessels, irises, or a combination thereof. In the following description, an "iris" is used as an example. However, this does not limit the object of each example embodiment to the iris. The biometrics to be used in each example embodiment is not limited.

Information regarding the biometrics (biometric information) includes a plurality of types of information such as an image or sounds. Although an image (specifically, iris image) is used as an example of the biometric information in the following description, this does not intend to limit each example embodiment.

A code used in each example embodiment is generated on the basis of the biometric information (iris image). The code may be a one-dimensional code (for example, bar code) or a two-dimensional code (for example, QR code(®)). Alternatively, the code may be a code using information related to three dimensions such as a hologram. As described above, the code is a numerical value converted into a predetermined form.

In each example embodiment, it is sufficient that a code be generated using a generation method according to specifications of each code.

As an example, in a case where a bar code is described, the generation of the code is the following operation. An image to be converted into a code is converted into binary (zero and one) continuous data (serial data). From either side (top or bottom) of the data, "0" and "1" are converted into the codes as follows. As for "0", the number of "0" consecutively provided (however, in range from one to four) is converted into a predetermined and related four types of spaces (white rectangle). As for "1", the number of "1" consecutively provided (however, in range from one to four) is converted into a predetermined and related four types of bars (black rectangle). Predetermined codes (left and right guard bars, center bar, left and right margins) are added to the code that is a combination of the rectangles created in this way to form a bar code.

Applications to generate the bar code or the like are widely provided. Therefore, it is sufficient that each example embodiment use these applications.

However, the format of the code to be used by each example embodiment is not limited to the above.

It is desirable that the code be information of which an information amount is reduced in such a way that the biometric information cannot be estimated from the code.

This is for the following reasons.

The code is information imaged and communicated for each accounting processing. The plurality of times of accounting processing is often executed. Therefore, the code is information that may be imaged and communicated a plurality of times. Then, as the number of times of imaging and communication increases, the possibility increases that the information is leaked to a third party. Therefore, to prevent the leakage of the biometric information, it is desirable that the code be information from which the biometric information cannot be estimated.

The reduction in the information amount is generally reduction in an amount of data. Therefore, the communication using the codes reduces a communication load between devices in comparison with communication using the biometric information. The processing using the codes causes a lower processing load than processing using the biometric information.

Moreover, the code may include another piece of information in addition to the biometric information.

Each example embodiment executes accounting processing. However, accounting processing executed by each example embodiment is not limited. For example, the accounting processing includes settlement processing for totaling deposits and withdrawals, and individual deposit processing or withdrawal processing. Alternatively, the accounting processing includes withdrawal from or payment to an account for accounting (for example, bank account). Alternatively, the accounting processing includes establishment of liability to an individual (for example, charging fee to debit account for credit). In the following description, as an example, the accounting processing is assumed as a charge of a fee to a debit account for credit unless otherwise noted.

First Example Embodiment

Hereinafter, a first example embodiment will be described with reference to the drawings.

[Description of Configuration]

First, a configuration of an accounting system 400 according to the first example embodiment will be described with reference to the drawings.

FIG. 1 is a block diagram illustrating an example of the configuration of the accounting system 400 according to the first example embodiment.

The accounting system 400 includes an information display device 100, an information processing device 200, and an information providing device 300.

In FIG. 1, the number of each device included in the accounting system 400 is one. However, this is to clarify the drawings, and this does not limit the number of devices included in the accounting system 400. The number of each of the same devices included in the accounting system 400 is not limited to one. For example, the accounting system 400 may include the plurality of information processing devices 200.

The information display device 100 is connected to the information providing device 300 via a communication path. The information processing device 200 is connected to the information providing device 300 via a communication path. The communication paths may be lines in the same network or may be in different networks.

The information providing device 300 provides information to the information display device 100 and the information processing device 200 via the communication paths.

An acquisition source of the information provided by the information providing device 300 is not limited. For example, the information providing device 300 may acquire information from a device (not illustrated) providing information and may provide the acquired information. However, for convenience of explanation, in the following description, it is assumed that the information providing device 300 store information in advance.

The information providing device 300 may authenticate the information display device 100 and/or the information processing device 200.

For example, as described later, the information providing device 300 receives an iris image from the information display device 100. Therefore, the information providing device 300 may determine whether a request is from a valid person (for example, owner of information display device 100) by using the received iris information.

The information display device 100 images an iris, acquires a code related to the imaged iris from the information providing device 300, and displays the acquired code.

The information processing device 200 images the code displayed by the information display device 100, acquires accounting information related to the imaged code from the information providing device 300, and executes accounting processing related to an individual by using the acquired accounting information. The accounting information and the accounting processing are not limited. The accounting information is, for example, an account number. In such a case, the accounting processing is, for example, a charge for the account.

In a case where the accounting system 400 is applied to a shopping mall, for example, each device operates as follows.

The information providing device 300 is a device that is provided in a shopping mall operating company, a bank, or the like. The information providing device 300 stores necessary information (for example, accounting information) in advance.

The information display device 100 is a device to be used by a user of the shopping mall. For example, the user of the shopping mall images his/her iris with the information display device 100 (for example, with mobile phone, or the like) at the time of entering the shopping mall. Next, the information display device 100 acquires a code related to the iris from the information providing device 300 and stores the code in the information display device 100. Then, for example, the user operates the information display device 100 at the time of purchasing a product, and displays the code.

The information processing device 200 is a device provided in a shop in the shopping mall. The information processing device 200 is provided in each shop. That is, the plurality of information processing devices 200 is provided in the shopping mall, and is connected via wired or wireless communication paths. The information processing device 200 may be a device that is carried by a salesperson of the shop.

The salesperson reads the code displayed on the information display device 100 by using the information processing device 200 at the time when the user purchases a product. The information processing device 200 charges for the product to an account related to the read code.

Moreover, the information processing device 200 may change a price or the like for the user by using the code. For example, the information processing device 200 may determine whether the user is a tax-exempt person or taxable. Alternatively, the information processing device 200 may determine whether the user is a general customer or a member. The information processing device 200 may acquire information used for the above determination from the information providing device 300 as the accounting information.

The shopping mall is an example of a facility in which the information processing device 200 is provided. The facility in which the information processing device 200 is provided is not limited to the shopping mall. For example, the facility in which the information processing device 200 is provided includes an airport, an art museum, a museum, an exhibition hall, a library, or an amusement park.

In these facilities, there is a case where biometric information of a user is used for authentication of a visitor at the time when the user enters the facility. In such a case, the user of these facilities may acquire a code from the biometric information used for the authentication at the time of the authentication (biometric authentication) at the entrance. For example, an authentication device in the facility may generate a code on the basis of the biometric information used for the authentication and provide the generated code to the information display device 100.

The information providing device 300 may be an external device of the accounting system 400. In this case, it is sufficient that the accounting system 400 acquire information from an external device related to the information providing device 300 as necessary.

Next, a detailed configuration of each device will be described.

The information providing device 300 includes an information storage unit 310 and an information providing unit 320.

The information storage unit 310 stores information to be used by the information display device 100 and the information processing device 200. The information storage unit 310 stores information that needs to be associated by associating the pieces of information with each other.

For example, in the description according to the present example embodiment, the information storage unit 310 stores the following information.

The information storage unit 310 stores an iris image and a code in association with each other. Moreover, the information storage unit 310 stores the code and accounting information in association with each other.

As long as the information storage unit 310 stores the necessary information before a request from the information display device 100 or the like, a timing for storing the information is not limited. A transmission source which transmits the information to the information storage unit 310 is not limited. It is sufficient that the information providing device 300 receive information from a related device (for example, device in bank) in advance and store the information.

The information storage unit 310 may store the above information as a set of information. Alternatively, the information storage unit 310 may store the above information as a plurality of pieces of information. In this case, the information storage unit 310 may be configured by using a plurality of configurations or devices. For example, the information storage unit 310 may be configured using a configuration that stores an iris image and a code in association with each other (first storage unit) and a configuration that stores a code and accounting information in association with each other (second storage unit). Alternatively, the information providing device 300 is configured as a combination of a device including the first storage unit and a device including the second storage unit.

The information providing unit 320 provides information related to an instruction from the information stored in the information storage unit 310 by using an association between the information on the basis of instructions from the information display device 100 and the information processing device 200.

In a case of instructed to provide a code related to an iris image from the information display device 100, the information providing unit 320 provides the code related to the iris image included in the instruction from the codes stored in the information storage unit 310 to the information display device 100. The information providing device 300 may authenticate the information display device 100 that transmits codes in order to improve security in distribution of the codes.

However, the iris images generated by the information display device 100 are not constantly the same even if the iris of the same individual is used.

For example, the iris image changes according to a position of the iris with respect to the information display device 100. As a result, the iris images received by the information providing device 300 do not necessarily match even if the iris images are iris images of the same individual.

Therefore, when it is determined whether the iris image received from the information display device 100 matches the stored iris image, the information providing unit 320 may allow an error within a predetermined range in addition to complete match. For example, the information providing unit 320 may use a match of equal to or more than 95% in the determination as to whether the iris images match. Alternatively, in a case where the information storage unit 310 stores a plurality of iris images, the information providing unit 320 may determine an iris image of which a match rate is the highest as a matching iris image.

Moreover, the information providing unit 320 may use image processing such as movement, rotation, enlargement, reduction, and deformation of an image, and combinations thereof, or the like in determination as to whether the iris images match.

The information providing device 300 may create a code on the basis of the iris image received from the information display device 100. In this case, it is not necessary for the information providing device 300 to include the information storage unit 310.

Alternatively, in a case of instructed to provide the accounting information related to the code from the information processing device 200, the information providing unit 320 provides the accounting information related to the code included in the instruction from the accounting information stored in the information storage unit 310 to the information processing device 200. The information providing device 300 may authenticate the information processing device 200 that transmits accounting information in order to improve the security in the distribution of the accounting information.

There is a case where a plurality of methods is used as a method for generating a code from biometric information. In this case, a code to be generated may be different for each method. Therefore, the information providing device 300 may store a code for each method used by the accounting system 400 as a code to be associated with an accounting image.

Moreover, for example, the code may include information indicating the method for generating the code. In this case, the information providing unit 320 may select a code to be compared in consideration of the generation method included in the code.

As in the determination regarding whether the iris images match, the information providing unit 320 may use a predetermined allowable range regarding the match of the codes.

The information display device 100 includes an imaging unit 110 (hereinafter, also referred to as "first imaging unit" as necessary), a code acquisition unit 120, and a code display unit 130.

The imaging unit 110 images a person or a part of a person and acquires the captured image. For example, the imaging unit 110 images an iris and generates an iris image. The imaging unit 110 may be an external device of the information display device 100. For example, the imaging unit 110 may be a camera provided at an entrance of a facility.

The code acquisition unit 120 acquires a code related to the iris from the information providing device 300 by using the iris image imaged by the imaging unit 110 (first imaging unit).

The code display unit 130 displays the acquired code. For example, the code display unit 130 may include a liquid crystal display (not illustrated) and display the code on the liquid crystal display. The code display unit 130 may display the code on an external device (not illustrated). In this way, the code display unit 130 displays a code based on physical characteristics peculiar to a person such as an iris. The information processing device 200 includes an imaging unit 210 (hereinafter, also referred to as "second imaging unit" as necessary), an accounting information acquisition unit 220, and an accounting processing unit 230.

The imaging unit 210 images the code displayed by the information display device 100 and outputs the captured image data.

The accounting information acquisition unit 220 acquires accounting information from the information providing device 300 by using the code from the image data.

The accounting processing unit 230 executes accounting processing by using the acquired accounting information. For example, the accounting processing unit 230 charges a price of a product to a debit account of a bank.

In the above, the iris is imaged at the first time. Thereafter, the accounting system 400 may execute the accounting processing (for example, charging fee for product to debit account) by using the code.

In this way, the accounting system 400 can execute the plurality of times of accounting processing such as purchases in a plurality of shops while suppressing the number of times of communication of the information regarding the physical characteristics (for example, iris image) to once.

[Description of Operation]

Next, an operation of the accounting system 400 according to the first example embodiment will be described with reference to the drawings.

Figure 2:
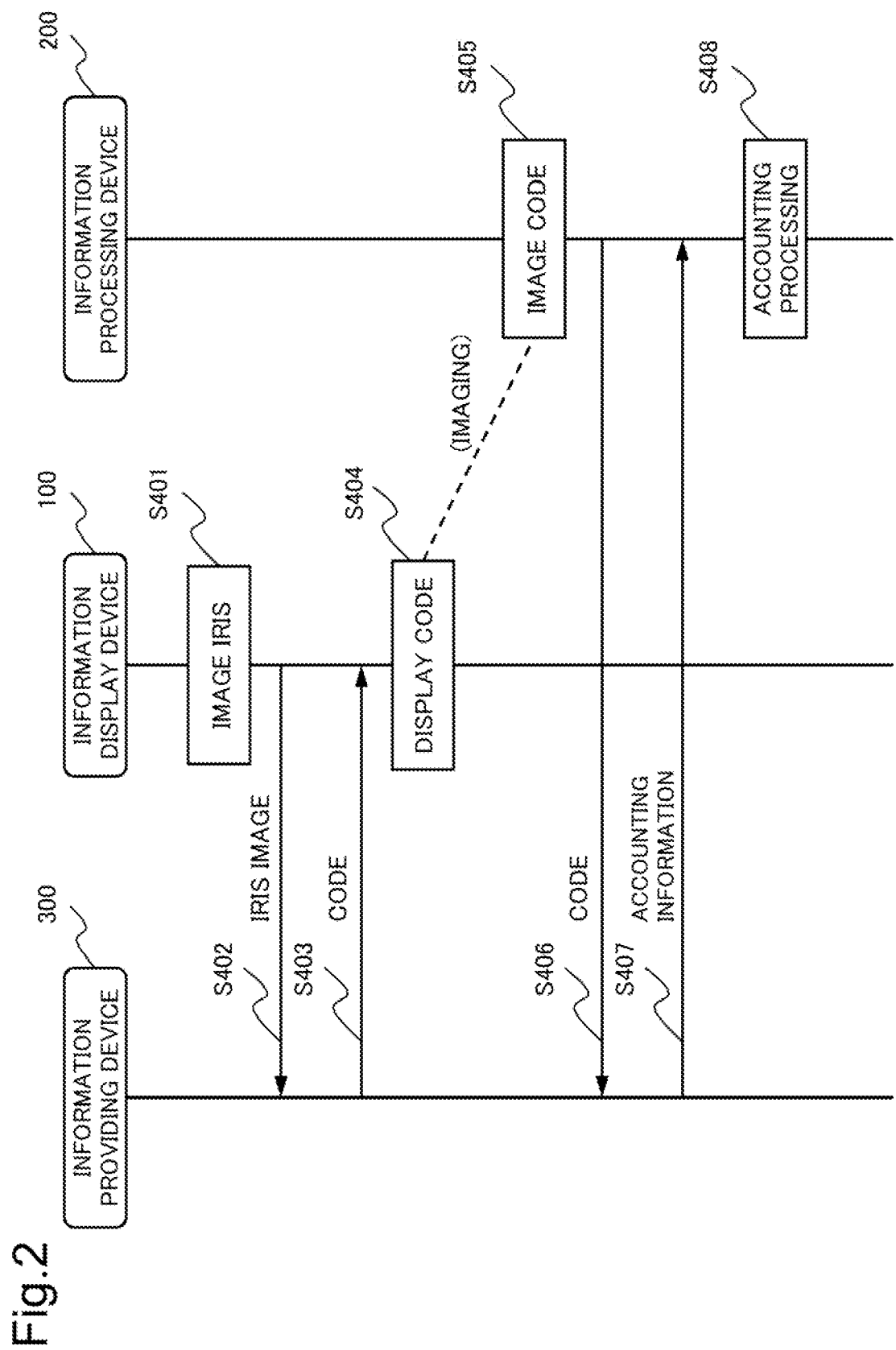
FIG. 2 is a sequence diagram illustrating an example of an operation of the accounting system according to the first example embodiment.

FIG. 2 is a sequence diagram illustrating an example of the operation of the accounting system 400 according to the first example embodiment.

The information providing device 300 stores necessary information in advance.

First, the information display device 100 images an iris (S401).

The information display device 100 transmits an iris image to the information providing device 300 (S402).

The information providing device 300 sends back a code related to the iris image (S403).

The information display device 100 displays the received code (S404).

The information processing device 200 images the code (S405).

The information processing device 200 transmits data of the imaged code to the information providing device 300 (S406).

The information providing device 300 sends back accounting information related to the code (S407).

The information processing device 200 executes accounting processing by using the received accounting information (S408).

The accounting system 400 may repeat the operations from S404 to S408. The plurality of information processing devices 200 may execute the operations from S405 to S408.

Description of Effect

Next, an effect of the accounting system 400 according to the first example embodiment will be described.

The accounting system 400 according to the first example embodiment can obtain an effect of reducing the number of times of provision of the information regarding the physical characteristics.

The reasons are as follows.

The accounting system 400 includes the information display device 100 and the information processing device 200. The information display device 100 includes the imaging unit 110 (first imaging unit), the code acquisition unit 120, and the code display unit 130. The imaging unit 110 images a person who makes a payment and acquires an image in which physical characteristics peculiar to the person are imaged. The code acquisition unit 120 acquires a code related to the image in which the physical characteristics peculiar to the person are imaged. The code display unit 130 displays the acquired code, that is, the code based on the physical characteristics peculiar to the person. The information processing device 200 includes the imaging unit 210 (second imaging unit), the accounting information acquisition unit 220, and the accounting processing unit 230. The imaging unit 210 images the code displayed by the information display device 100. The accounting information acquisition unit 220 acquires accounting information of the person by using the imaged code. The accounting processing unit 230 executes accounting processing by using the accounting information.

The information providing device 300 provides the information required in the above.

In the accounting system 400 described above, the information display device 100 can display the code any number of times on the basis of single imaging of a biometric image. Then, the information processing device 200 can execute the accounting processing any number of times by using the code displayed on the information display device 100. Moreover, the plurality of information processing devices 200 can execute the accounting processing any number of times using the code displayed on the information display device 100.

In this way, the accounting system 400 can execute the plurality of times of accounting processing by the information processing device 200 on the basis of single imaging of the biometrics image by the information display device 100.

Moreover, because the accounting system 400 uses the code displayed on the information display device 100, leakage of the information regarding the physical characteristics of the user can be prevented.

The accounting system 400 may set a usable period or a usable range for the code. For example, the accounting system 400 may limit an expiration of the code to a date of entry to the facility where the information processing device 200 is provided. Alternatively, the accounting system 400 may limit the number or the range of the information processing devices 200 that can use the code.

In this case, unauthorized use of the code on the side of the information processing device 200 can be prevented to some extent.

Moreover, the accounting system 400 provides an effect that the accounting processing can be executed without providing the biometric information to a third party such as a shop or the like where the information processing device 200 or the like is provided.

This is because the information display device 100 displays the code, not the biometric information, to the information processing device 200.

[Outline of Example Embodiment]

Next, an outline of the first example embodiment will be described with reference to the drawings.

Figure 3:
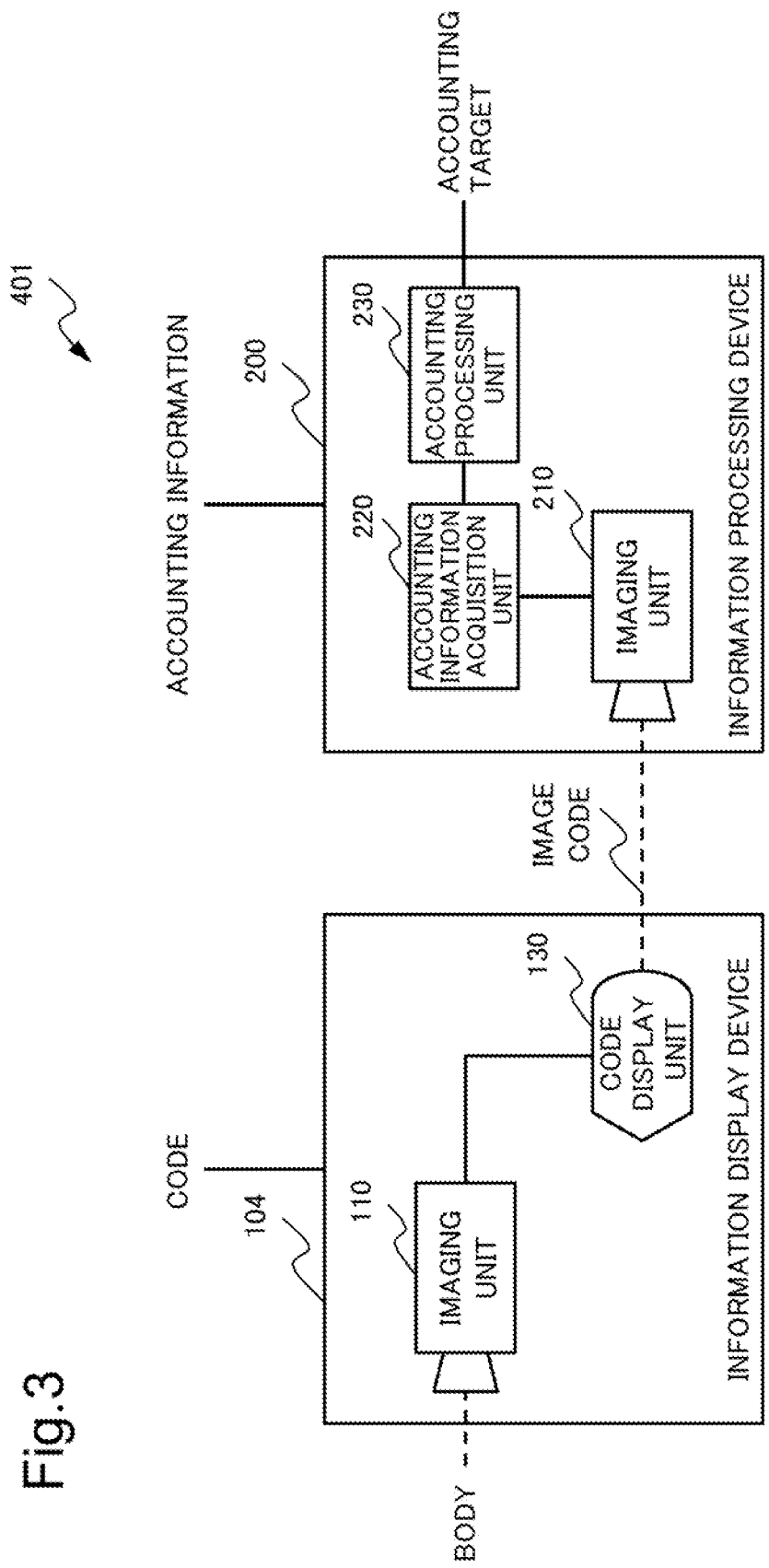
FIG. 3 is a block diagram illustrating an example of a configuration of an accounting system that is an outline of the first example embodiment.

FIG. 3 is a block diagram illustrating an example of a configuration of an accounting system 401 that is the outline of the first example embodiment.

The accounting system 401 includes an information display device 104 and an information processing device 200. The information display device 104 includes an imaging unit 110 (first imaging unit) and a code display unit 130. The imaging unit 110 images a person. The code display unit 130 displays a code based on physical characteristics peculiar to the imaged person. The information processing device 200 includes the imaging unit 210 (second imaging unit), the accounting information acquisition unit 220, and the accounting processing unit 230. The imaging unit 210 images the code displayed by the information display device 100. The accounting information acquisition unit 220 acquires accounting information of the person by using the imaged code. The accounting processing unit 230 executes accounting processing by using the accounting information.

The information display device 104 and the information processing device 200 are connected to a device related to the information providing device 300 and acquire information. Then, as described above, each configuration included in the accounting system 401 similarly operates to each corresponding configuration in the accounting system 400.

The accounting system 401 configured in this way can obtain the similar effect to the accounting system 400. This is because each configuration of the accounting system 401 similarly operates to the similar configuration in the accounting system 400. That is, this is because the accounting system 401 can execute a plurality of times of accounting processing using the single-time acquisition of the physical characteristics.

The accounting system 401 is an example of a minimum configuration of the accounting system 400 according to the first example embodiment.

Figure 4:
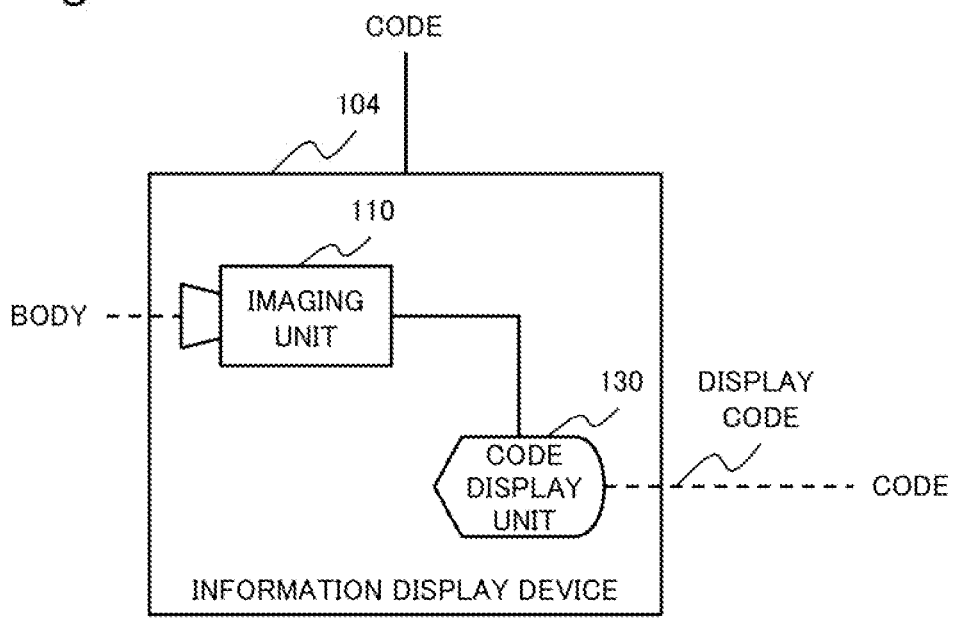
FIG. 4 is a block diagram illustrating an example of an outline of an information display device according to the first example embodiment.

FIG. 4 is a block diagram illustrating an example of an outline of the information display device 104 according to the first example embodiment.

The information display device 104 illustrated in FIG. 4 includes components similar to those of the information display device 104 illustrated in FIG. 3. The information display device 104 is connected to a device that has a function similar to that of the information providing device 300.

The information display device 104 includes the imaging unit 110 (first imaging unit) and the code display unit 130. The imaging unit 110 images a person. The code display unit 130 displays a code based on physical characteristics peculiar to the imaged person as a code imaged by the device related to the information processing device 200. The device related to the information processing device 200 images the code, acquires accounting information of the person by using the imaged code, and executes accounting processing by using the accounting information.

The information display device 104 configured in this way displays the code using each configuration while reducing the number of times of the provision of the information regarding the physical characteristics.

This is because each configuration of the information display device 104 illustrated in FIG. 4 operates similarly to the configuration of the information display device 100 described with reference to FIG. 1.

The information display device 104 illustrated in FIG. 4 is an example of a minimum configuration of the information display device 100 according to the first example embodiment.

Figure 5:
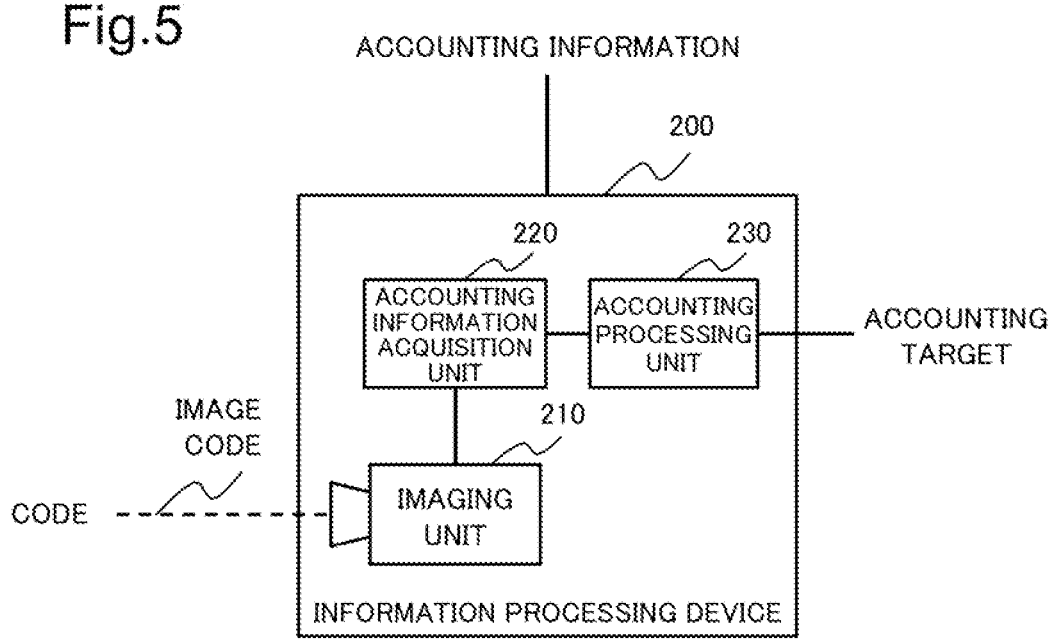
FIG. 5 is a block diagram illustrating an example of an outline of an information processing device according to the first example embodiment.

FIG. 5 is a block diagram illustrating an example of an outline of the information processing device 200 according to the first example embodiment.

The information processing device 200 illustrated in FIG. 5 includes components similar to those of the information processing device 200 illustrated in FIG. 1. The information processing device 200 is connected to a device that has a function similar to that of the information providing device 300.

Then, the information processing device 200 includes the imaging unit 210 (second imaging unit), the accounting information acquisition unit 220, and the accounting processing unit 230. The imaging unit 210 images the code displayed by the device related to the information display device 100. The device related to the information display device 100 images a person and displays a code based on physical characteristics peculiar to the imaged person. The accounting information acquisition unit 220 acquires accounting information of the person by using the imaged code. The accounting processing unit 230 executes accounting processing by using the accounting information.

The information processing device 200 configured in this way executes accounting processing related to the code using each configuration while reducing the number of times of the provision of the information regarding the physical characteristics.

This is because each configuration of the information processing device 200 illustrated in FIG. 5 operates similarly to the configuration of the information processing device 200 described with reference to FIG. 1.

The information processing device 200 illustrated in FIG. 5 is an example of a minimum configuration of the information processing device 200 according to the first example embodiment.

[Hardware Configuration]

Next, hardware configurations of the information display device 100, the information processing device 200, and the information providing device 300 (hereinafter, referred to as "information display device 100 or the like") will be described.

Each component of the information display device 100 or the like may be configured with a hardware circuit.

Alternatively, in the information display device 100 or the like, each component may be configured using a plurality of devices connected via a network.

Alternatively, in the information display device 100 or the like, a plurality of components may be configured by single hardware.

Alternatively, the information display device 100 or the like may be implemented as a computer including a Central Processing Unit (CPU), a Read Only Memory (ROM), and a Random Access Memory (RAM). The information display device 100 or the like may be implemented as a computer further including an Input and Output Circuit (IOC) in addition to the above configuration. The information display device 100 or the like may be implemented as a computer further including a Network Interface Circuit (NIC) in addition to the above configuration.

Figure 6:
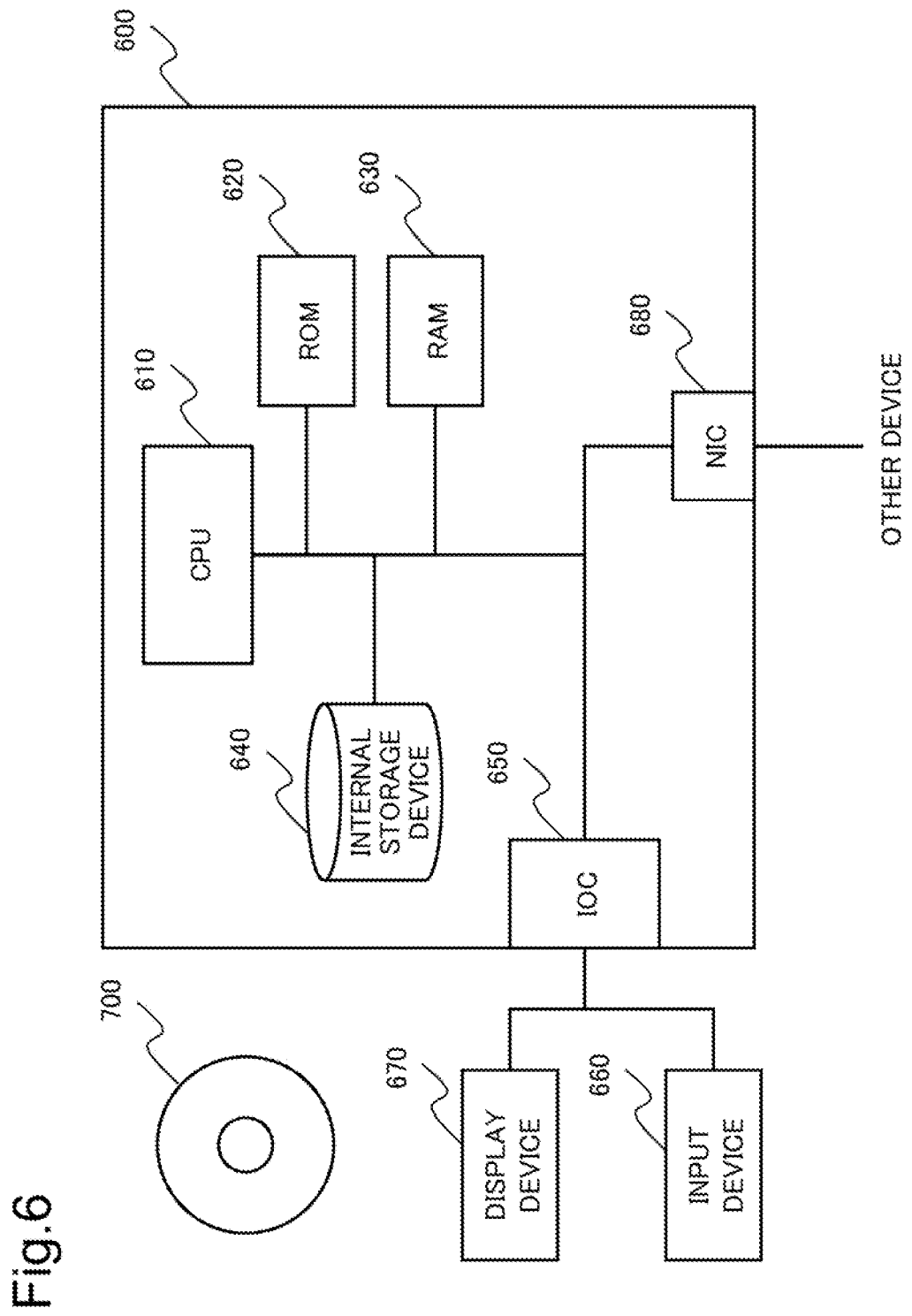
FIG. 6 is a block diagram illustrating an example of a hardware configuration of the information display device and the like according to the first example embodiment.

FIG. 6 is a block diagram illustrating a configuration of an information processing device 600 that is an example of the hardware configuration of the information display device 100 or the like according to the first example embodiment.

The information processing device 600 includes a CPU 610, a ROM 620, a RAM 630, an internal storage device 640, an IOC 650, and an NIC 680 and configures a computer.

The CPU 610 reads a program from the ROM 620 and/or the internal storage device 640. Then, the CPU 610 controls the RAM 630, the internal storage device 640, the IOC 650, and the NIC 680 on the basis of the read program.

Then, the computer including the CPU 610 controls these configurations and implements each function of the information display device 100 or the like illustrated in FIG. 1. For example, the computer including the CPU 610 implements functions as the imaging unit 110, the code acquisition unit 120, and the code display unit 130 in the information display device 100. Alternatively, the computer including the CPU 610 implements functions as the imaging unit 210, the accounting information acquisition unit 220, and the accounting processing unit 230 in the information processing device 200. Alternatively, the computer including the CPU 610 implements functions as the information storage unit 310 and the information providing unit 320 in the information providing device 300.

In a case of implementing the function as the imaging unit 110 or the imaging unit 210, the computer including the CPU 610 may include an imaging device (not illustrated) such as a camera. In this case, the imaging device images an iris on the basis of an instruction from the CPU 610. For example, the computer including the CPU 610 may use an input device 660 to be described later as the imaging device used for the imaging unit 110 or the imaging unit 210. In this case, the computer including the CPU 610 may include the input device 660. However, the input device 660 does not need to be included in the computer.

The CPU 610 may use the RAM 630 or the internal storage device 640 as a temporary storage medium of a program when each function is implemented.

The CPU 610 may read a program included in a recording medium 700 that stores a computer-readable program by using a storage medium reading device which is not illustrated. Alternatively, the CPU 610 may receive a program from an external device (not illustrated) via the NIC 680, store the program in the RAM 630 or the internal storage device 640, and operate on the basis of the saved program.

The ROM 620 stores the program executed by the CPU 610 and fixed data. The ROM 620 is, for example, a Programmable-ROM (P-ROM) or a flash ROM.

The RAM 630 temporarily stores the program to be executed by the CPU 610 and data. The RAM 630 is, for example, a Dynamic-RAM (D-RAM).

The internal storage device 640 stores data and a program that are stored in the information processing device 600 in the long term. The internal storage device 640 may operate as a temporary storage device of the CPU 610. The internal storage device 640 is, for example, a hard disk device, a magneto-optical disk device, a Solid State Drive (SSD), or a disk array device.

The ROM 620 and the internal storage device 640 are non-volatile (non-transitory) storage media. The RAM 630 is a volatile (transitory) storage medium. Then, the CPU 610 can operate based on the program stored in the ROM 620, the internal storage device 640, or the RAM 630. That is, the CPU 610 can operate by using the non-volatile storage medium or the volatile storage medium.

The IOC 650 mediates data between the CPU 610, and the input device 660 and a display device 670. The IOC 650 is, for example, an IO interface card or a Universal Serial Bus (USB) card. Moreover, the IOC 650 may use wireless communication without limiting to wired communication such as the USB.

The input device 660 is a device that receives an input instruction from an operator of the information processing device 600. The input device 660 is, for example, a keyboard, a mouse, or a touch panel. The input device 660 may be an imaging device used for the imaging unit 110 or the imaging unit 210.

The display device 670 is a device that presents information to an operator of the information processing device 600. For example, the code display unit 130 may display a code on the display device 670. The display device 670 is, for example, a liquid crystal display, an organic electroluminescent display, or electronic paper.

The NIC 680 relays data exchange with the information display device 100 or the like via the network and data exchange between the information display device 100 or the like and an external device (not illustrated). The NIC 680 is, for example, a Local Area Network (LAN) card. Moreover, the NIC 680 may use a wireless network without limiting to the wired network.

The information processing device 600 configured in this way can obtain an effect similar to the information display device 100 or the like.

This is because the CPU 610 of the information processing device 600 can implement a function similar to that of the information display device 100 or the like based on the program.

Second Example Embodiment

An iris image is sensitive information. It is desirable to use communication using a communication path in which security is ensured for communication of the iris image. It is also desirable not to associate an iris image of an individual with accounting information of the individual.

Therefore, as a second example embodiment, an accounting system 402 will be described that improves security of communication of an iris image. A configuration and an operation similar to those in the first example embodiment are appropriately omitted in the following description.

Figure 7:
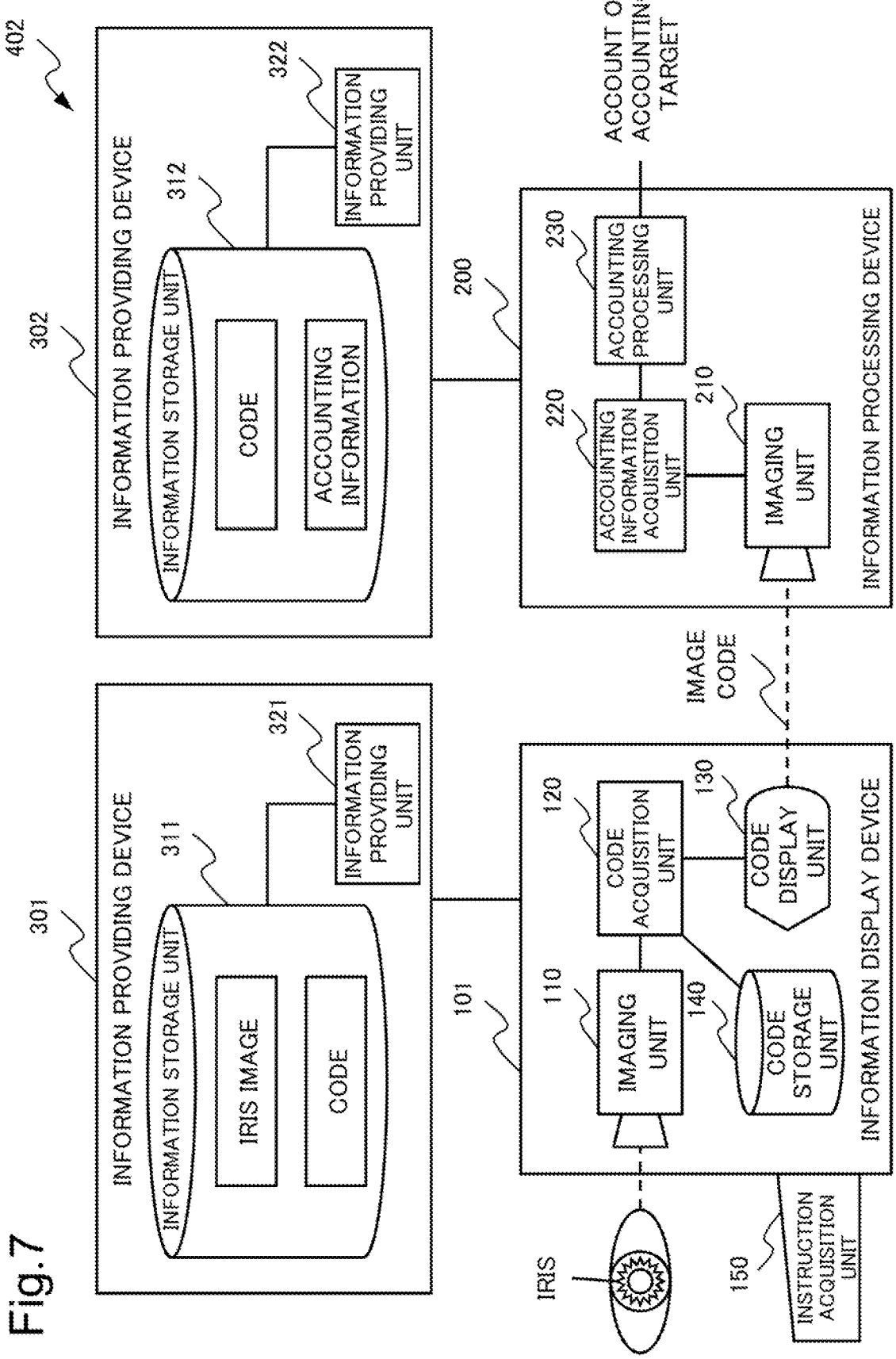
FIG. 7 is a block diagram illustrating an example of a configuration of an accounting system according to a second example embodiment.

FIG. 7 is a block diagram illustrating an example of a configuration of the accounting system 402 according to the second example embodiment. FIG. 7 does not limit the number of devices included in the accounting system 402. For example, the accounting system 402 may include a plurality of information processing devices 200. Each device included in the accounting system 402 may be configured using the computer illustrated in FIG. 6. In a case where each device is implemented using the computer, the accounting system 402 may include an imaging device such as a camera as necessary.

The accounting system 402 includes an information display device 101, an information processing device 200, an information providing device 301, and an information providing device 302.

The information providing device 301 includes an information storage unit 311 and an information providing unit 321.

The information storage unit 311 stores information to be provided to the information display device 101. In the description of the present example embodiment, the information storage unit 311 stores an iris image and a code in association with each other. However, this is not intended to limit the present example embodiment. The information stored in the information storage unit 311 is not limited to the above.

The information providing unit 321 provides the code associated with the iris image received from the information display device 101 to the information display device 101.

The information providing device 302 includes an information storage unit 312 and an information providing unit 322.

The information storage unit 312 stores information to be provided to the information processing device 200. In the description of the present example embodiment, the information storage unit 312 stores a code and accounting information in association with each other. However, this is not intended to limit the present example embodiment. The information stored in the information storage unit 311 is not limited to the above.

The information providing unit 322 provides the accounting information associated with the code received from the information processing device 200 to the information processing device 200.

The configuration of the information processing device 200 is similar to that of the first example embodiment. However, the information processing device 200 is connected to the information providing device 302. Then, similarly to the first example embodiment, the information processing device 200 acquires the accounting information from the information providing device 302 by using the imaged code and executes accounting processing. The information processing device 200 does not need to be connected to the information providing device 301 that stores iris images.

The information display device 101 includes a code storage unit 140 and an instruction acquisition unit 150, in addition to the configuration of the information display device 100.

The code acquisition unit 120 acquires a code related to the iris image imaged by the imaging unit 110 from the information providing device 301. Then, the code acquisition unit 120 requests the code storage unit 140 to store the acquired code.

Moreover, the code acquisition unit 120 acquires the code stored in the code storage unit 140 in response to the instruction and displays the code on the code display unit 130.

The code storage unit 140 stores a code.

Moreover, the code storage unit 140 may store not only one code but also the plurality of codes as the codes related to the imaged iris image. In this case, the code acquisition unit 120 may select a code to be displayed from among the plurality of codes in accordance with a selection rule. For example, the code acquisition unit 120 may randomly select the code for each display.

Moreover, a timing when the displayed code is changed by the code acquisition unit 120 is not limited. For example, the code acquisition unit 120 may change the code when the number of times of display of the code exceeds a predetermined number. Alternatively, the code acquisition unit 120 may change the codes at predetermined time intervals. Alternatively, the code acquisition unit 120 may acquire an instruction regarding the selection of the code to be displayed from the instruction acquisition unit 150 to be described later.

The instruction acquisition unit 150 receives the instruction to display the code in the information display device 101.

The instruction acquisition unit 150 is, for example, a switch, a key, or a touch panel of the information display device 101. Alternatively, the instruction acquisition unit 150 may be an acceleration sensor or a rotation sensor included in the information display device 101.

Then, the information display device 101 operates as follows.

The information display device 101 images an iris by using the imaging unit 110, acquires a code related to the iris image from the information providing device 301 using the code acquisition unit 120, and stores the code in the code storage unit 140, in advance. A communication path used to acquire the code from the information providing device 301 by the information display device 101 is desirably a secure communication path (for example, direct connection using cable or the like, dedicated line, or intranet connection in facility in which security is ensured).

Then, the code acquisition unit 120 displays the code stored in the code storage unit 140 on the code display unit 130 in response to the instruction from the instruction acquisition unit 150.

The code storage unit 140 may store the iris image in association with the code. In this case, the code acquisition unit 120 operates, for example, as follows.

First, the code acquisition unit 120 acquires the code related to the iris image imaged by the imaging unit 110 from the information providing device 301 in advance. Then, the code storage unit 140 stores the iris image and the code in association with each other.

Then, the code acquisition unit 120 acquires the iris image imaged by the imaging unit 110 in response to the instruction from the instruction acquisition unit 150. Then, the code acquisition unit 120 determines whether the imaged iris image matches the iris image stored in the code storage unit 140. Then, in a case where the iris images match, the code acquisition unit 120 acquires the code stored in the code storage unit 140. Then, the code display unit 130 displays the acquired code.

Moreover, the code storage unit 140 may store the multiple iris images and the codes related to the respective iris images in association with each other. In this case, the code acquisition unit 120 may operate as follows.

The code acquisition unit 120 acquires the iris image by using the imaging unit 110 in response to the instruction from the instruction acquisition unit 150. Then, the code acquisition unit 120 compares the iris image stored in the code storage unit 140 and the acquired iris image and acquires a code related to a most-matching iris image. Then, the code acquisition unit 120 displays the acquired code on the code display unit 130.

As described above, a communication path and a communication partner (information providing device 302) used to acquire accounting information from the code by the information processing device 200 are different from the communication path and the communication partner (information providing device 301) used to acquire the code from the iris image by the information display device 101. Therefore, it is not possible for the information processing device 200 to acquire the iris image related to the code. That is, the accounting system 402 can reduce a possibility of leakage of the iris image.

Moreover, in a case where the accounting system 402 uses a highly secure communication path as the communication path between the information display device 101 and the information providing device 301, the accounting system 402 can further reduce the possibility of the leakage of the iris image.

In a case where the code storage unit 140 stores the code in association with the iris image, the code acquisition unit 120 may image an iris image in response to the instruction from the instruction acquisition unit 150 and may acquire a code related to an iris image that matches the imaged iris image from among the stored iris images. In this case, the accounting system 402 can protect display of the code in a case where a person who has stored the iris image in the information display device 101 in advance (for example, owner of information display device 101) is absent.

The information display device 101 may set limitation regarding a period in which the code is stored or the number of times when the code acquisition unit 120 acquires the code for the code stored in the code storage unit 140. For example, in a case where the code acquisition unit 120 acquires codes the predetermined number of times, the information display device 101 may delete the code stored in the code storage unit 140 and request a user or the like of the information display device 101 to reacquire a code.

Alternatively, the information display device 101 may discard the code on the basis of a position, a range, or the like. For example, the information display device 101 may discard the code, which has been stored at the time of entering a predetermined facility, at the time when leaving the facility.

[Description of Effect]

Next, an effect of the accounting system 402 according to the second example embodiment will be described.

The accounting system 402 according to the second example embodiment can provide an effect of improving the security of the biometric information (for example, iris image) in addition to the effect of the first example embodiment.

This is because the information processing device 200 uses a communication path different from the communication path used to receive the code using by the iris image by the information display device 101, as the communication path used to acquire the accounting information by using the code.

In a case where a highly secure communication path is used as the communication path used to acquire the code by the information display device 101, the accounting system 402 can further improve security of communication of an iris image.

In a case where the code storage unit 140 stores the code in association with the iris image, the accounting system 402 obtains an effect of protecting display of the code in case where an owner or the like of the information display device 101 is absent.

This is because the code acquisition unit 120 newly images an iris image in response to the instruction from the instruction acquisition unit 150 and acquires a code related to the imaged iris image.

Third Example Embodiment

An information display device 100 may directly generate a code from an iris image without using an information providing device 300. Therefore, a case where the information display device 100 generates a code will be described as a third example embodiment. In the following description, there is a case where a configuration and an operation similar to those of the first and second example embodiments are appropriately omitted.

Figure 8:
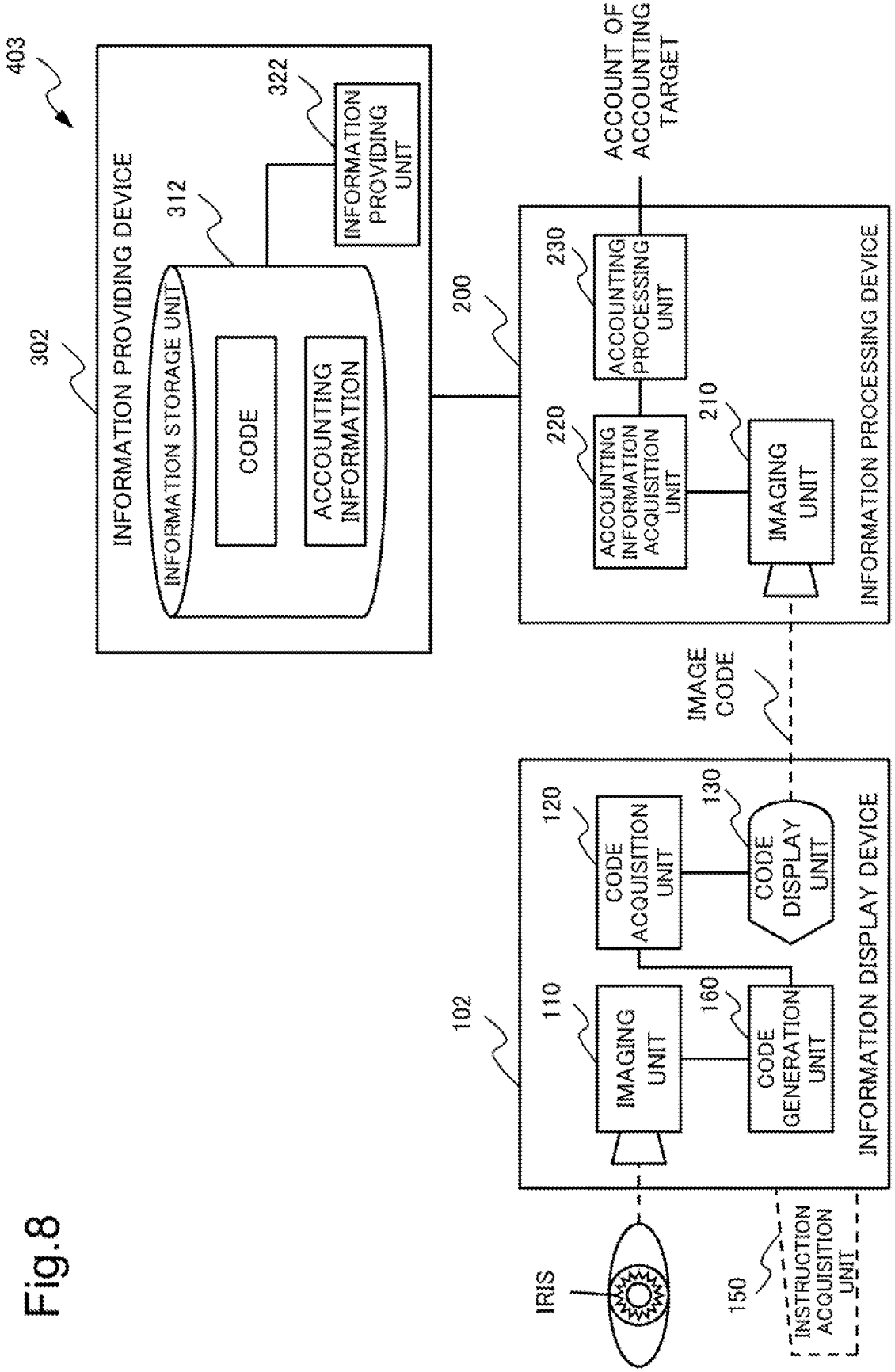
FIG. 8 is a block diagram illustrating an example of a configuration of an accounting system according to a third example embodiment.

FIG. 8 is a block diagram illustrating an example of a configuration of an accounting system 403 according to the third example embodiment.

FIG. 8 does not limit the number of devices included in the accounting system 403. For example, the accounting system 403 may include a plurality of information processing devices 200. Each device included in the accounting system 403 may be configured using the computer illustrated in FIG. 6. In a case where each device is implemented using the computer, the accounting system 403 may include an imaging device such as a camera as necessary.

The accounting system 403 includes an information display device 102, an information processing device 200, and an information providing device 302.

The information processing device 200 and the information providing device 302 are similar to those of the second example embodiment.

The information display device 102 includes a code generation unit 160, in addition to the configuration of the information display device 100.

The code generation unit 160 generates a code from an iris image imaged by an imaging unit 110.

A code acquisition unit 120 acquires the code from the code generation unit 160.

Other configurations are similar to those of the first example embodiment.

The number of times of code generation by the information display device 102 is not limited to one. For example, the information display device 102 may regenerate a code after a predetermined time has elapsed or in a case where the number of times of code display exceeds a predetermined number. In this case, the information display device 102 may display a request to regenerate the code on a display unit (not illustrated).

Alternatively, in a case where the information display device 102 includes an instruction acquisition unit 150, the information display device 102 may regenerate a code in response to an instruction from the instruction acquisition unit 150.

[Description of Effect]

Next, an effect of the accounting system 403 according to the third example embodiment will be described.

The accounting system 403 according to the third example embodiment can obtain an effect of avoiding communication of an iris image (that is, biometric information), in addition to the effect of the first example embodiment.

This is because the information display device 102 generates a code from the biometric information.

In the third example embodiment, it is not necessary to transmit the biometric information. Therefore, the third example embodiment can further improve security of the biometric information than the second example embodiment.

Fourth Example Embodiment

Identifiers (ID) are widely used as information used to identify individuals. An accounting system 400 may use a combination of a biometric image and an identifier.

An example of a case where an identifier is used will be described as a fourth example embodiment.

Figure 9:
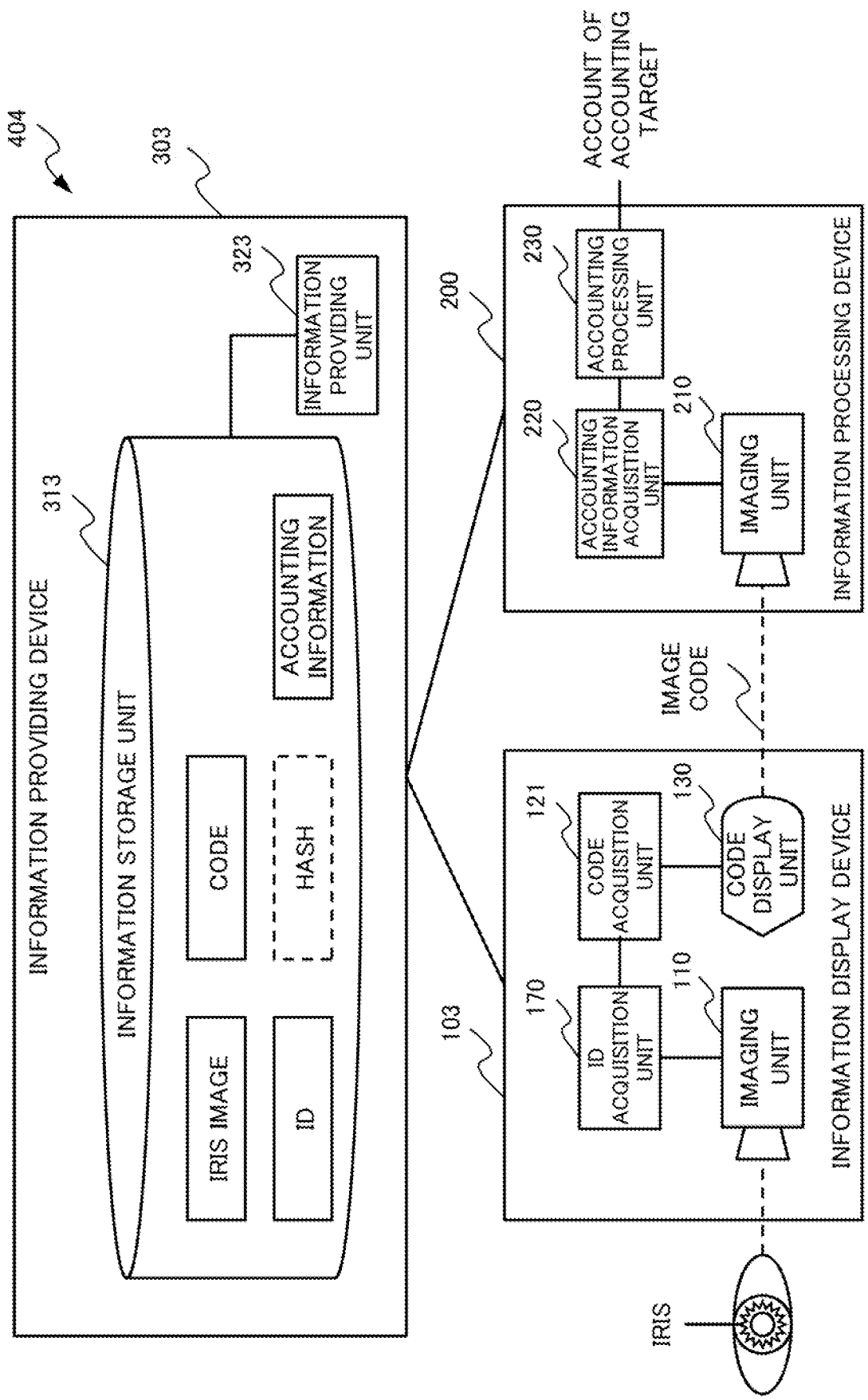
FIG. 9 is a block diagram illustrating an example of a configuration of an accounting system according to a fourth example embodiment.

FIG. 9 is a block diagram illustrating an example of a configuration of an accounting system 404 according to the fourth example embodiment.

FIG. 9 does not limit the number of devices included in the accounting system 404. For example, the accounting system 404 may include a plurality of information processing devices 200. Each device included in the accounting system 404 may be configured using the computer illustrated in FIG. 6. In a case where each device is implemented using the computer, the accounting system 404 may include an imaging device such as a camera as necessary.

The accounting system 404 includes an information display device 103, an information processing device 200, and an information providing device 303.

The information providing device 303 includes an information storage unit 313 and an information providing unit 323.

The information storage unit 313 includes an iris image, an identifier (ID), a code, and accounting information.

The information storage unit 313 stores the iris image and the ID in association with each other. For example, the information providing device 303 identifies an individual by using image authentication on the acquired iris image, and stores an ID and the iris image of the identified individual in association with each other in the information storage unit 313. Alternatively, the information providing device 303 may acquire an iris image, an ID, and information used to associate the iris image and the ID from a device (not illustrated), and store the iris image and the ID in association with each other.

Moreover, the information storage unit 313 stores the ID and the code in association with each other.

Moreover, the information storage unit 313 stores the code and the accounting information in association with each other.

In the present example embodiment, the code may be generated using data obtained by combining the iris image and the ID as original data of the code. In this way, the code may be generated from information obtained by combining the biometric information and other information regarding the individual. The biometric information such as an iris image is information that is at least partially unstable. On the other hand, the ID is information that does not change. Therefore, when the code is generated using the ID, the generated code is more stable than a case where the code is generated using the biometric information. In other words, in a case where the code is generated using the ID, code matching accuracy is improved.

The accounting system 404 may use authentication data to authenticate the code. That is, the accounting system 404 may receive the authentication data, in addition to the code, as information received from the information processing device 200 by the information providing device 303.

The accounting system 404 may use, for example, a hash obtained by applying the ID to a hash function as the authentication data.

However, the authentication data is not limited to the hash of the ID. For example, the code may be generated as including a part of the ID (for example, predetermined number of upper or lower bits). In this case, the accounting system 404 may use a bit of the ID that is not included in the code as the authentication data. The information providing device 303 can authenticate the code on the basis of comparison between a combination of the bit included in the code and the bit included in the authentication data and the ID.

The information providing unit 323 provides information to the information display device 103 and the information processing device 200.

Compared with the information display device 100 according to the first example embodiment, the information display device 103 includes a code acquisition unit 121 instead of the code acquisition unit 120, and further includes an ID acquisition unit 170.

The ID acquisition unit 170 acquires an ID from the information providing device 303 by using an iris image from an imaging unit 110. The ID acquisition unit 170 may be also referred to as an identifier acquisition unit.

The code acquisition unit 121 acquires a code from the information providing device 303 by using the ID.

The code display unit 130 displays the code.

The information processing device 200 operates similarly to the information processing device 200 according to the first example embodiment.

In a case where the accounting system 404 uses the authentication data, each device operates, for example, as follows.

The information display device 103 acquires the authentication data in addition to the code from the information providing device 303. Then, the information display device 103 provides the authentication data to the information processing device 200. For example, the information display device 103 provides the authentication data to the information processing device 200 by using short-range communication. Because the code is displayed on a display, there is a possibility that the code is imaged from a distance. However, the authentication data is not acquired from a distance. In this way, the authentication data has security different from that of the code.

The information processing device 200 transmits the authentication data acquired from the information display device 103 and the code to the information providing device 303.

The information providing device 303 authenticates the information processing device 200 by using the code and the authentication data. Then, the information providing device 303 provides accounting information to the authenticated information processing device 200.

[Description of Effect]

Next, an effect of the accounting system 404 according to the fourth example embodiment will be described.

The accounting system 404 obtains an effect of improving the code matching accuracy in addition to the effects of the first example embodiment.

This is because the accounting system 404 generates the code by using the ID in addition to the biometric information.

Moreover, in a case where the authentication data is used, the accounting system 404 further obtains an effect of improving stability in provision of the accounting information.

The identifier (ID) is widely used in a general information processing system. For example, the accounting system 404 can achieve a main required configuration by adding a configuration related to the iris image to a general accounting system. That is, the accounting system 404 obtains an effect that the accounting system 404 can be more easily constructed from a general accounting system than the first example embodiment or the like.

Fifth Example Embodiment

Left and right irises are different from each other. That is, the number of iris images used to specify an individual for each individual is two. Therefore, an example embodiment using two iris images of an individual will be described as a fifth example embodiment.

The accounting system 400 in FIG. 1 will be used in the following description of the fifth example embodiment. However, this does not limit the fifth example embodiment to the accounting system 400 illustrated in FIG. 1. The fifth example embodiment may be applied to the second example embodiment to the fourth example embodiment.

In the following description, a configuration and an operation similar to those of the first example embodiment will be omitted, and specific content of the fifth example embodiment will be described. In the following description, an image related to one iris is referred to as a "one-eye iris image", and a code related to the one-eye iris image is referred to as a "one-eye code". An image related to irises of both eyes is referred to as a "both-eye iris image", and a code related to the both-eye iris image is referred to as a "both-eye code". This similarly applies to the left eye and the right eye.

An information display device 100 displays either one of the one-eye code or the both-eye code in response to an instruction (for example, key operation) from a user of the information display device 100.

An information processing device 200 images the code displayed by the information display device 100 and transmits the imaged code to the information providing device 300.

An information providing unit 320 of the information providing device 300 determines whether the received code is a one-eye code or a both-eye code, and changes accounting information to be provided to the information processing device 200 on the basis of the determination result.

For example, in a case of receiving the one-eye code, the information providing unit 320 provides information regarding an account with a low usage limit as the accounting information. On the other hand, in a case of receiving a both-eye code, the information providing unit 320 provides information regarding an account with a high usage limit as the accounting information. This is because a case where a both-eye iris image is used, security is higher than a case where a one-eye iris image is used.

Alternatively, for example, the information providing unit 320 provides account information for a transfer as the accounting information in a case of receiving the one-eye code. On the other hand, the information providing unit 320 may provide debit account information as the accounting information in a case of receiving the both-eye code.

In this way, the accounting information acquired by the accounting information acquisition unit 220 by using the one-eye code is at least partially different from the accounting information acquired by using the both-eye code. In this case, "different" includes presence or absence of the information, that is, a case where the accounting information is in an inclusive relationship.

Alternatively, the information display device 100 may distinguish and use a right-eye code and a left-eye code. In this case, the information providing unit 320 may change the accounting information to be provided on the basis of a difference between the right code and the left code. For example, in a case where a user of the information display device 100 has two bank accounts, the information providing unit 320 may provide information regarding one of the two bank accounts for the left-eye code and provide information regarding the other bank account for the right-eye code.

The accounting system 400 may use the above combination, that is, three codes including the left-eye code, the right-eye code, and the both-eye code.

[Description of Effect]

Next, an effect of the fifth example embodiment will be described.

The fifth example embodiment obtains an effect that the accounting information to be provided to the information processing device 200 can be changed on the basis of the used eye, in addition to the effect of the first example embodiment.

The reasons are as follows.

The information display device 100 displays the one-eye code or the both-eye code. Alternatively, the information display device 100 displays the left-eye code or the right-eye code. The information providing device 300 changes the accounting information to be provided on the basis of which eye is related to the code received from the information processing device 200.

For example, the accounting system 400 according to the fifth example embodiment can cope with a plurality of accounts of the user of the information display device 100.

The example embodiments may be used in combination.

Although a part or all of the example embodiments may be described as supplementary notes below, a part or all of the example embodiments are not limited to the following supplementary notes.

(Supplementary Note 1)

An accounting system including:

an information display device including a first memory; and at least one first processor coupled to the first memory, the first processor performing first operations, the first operations including:
causing a first camera to image a person, and
causing a display to display a code based on physical characteristics peculiar to the imaged person; and
an information processing device including
a second memory; and
at least one second processor coupled to the second memory,
the second processor performing second operations, the second operations including:
causing a second camera to image the code displayed by the information display device,
acquiring accounting information of the person using the imaged code, and
executing accounting processing using the accounting information.

(Supplementary Note 2)
The accounting system accounting to supplementary note 1, in which
the first operations further includes
storing the code, and
causing the display to display the stored code in response to an instruction.

(Supplementary Note 3)
The accounting system according to supplementary note 1 or 2, in which
the first operations further includes
generating the code based on the imaged physical characteristics, and
causing the display to display the generated code.

(Supplementary Note 4)
The accounting system according to supplementary note 3, in which
the information display device is provided at an entrance of a facility.

(Supplementary Note 5)
The accounting system according to any one of supplementary notes 1 to 4, in which
the first operations further includes
acquiring an identifier of the person using the imaged physical characteristics, and
causing the display to display the code using the acquired identifier.

(Supplementary Note 6)
The accounting system according to supplementary note 5, in which
the code includes at least a part of the identifier.

(Supplementary Note 7)
The accounting system according to any one of supplementary notes 1 to 6, in which
the first operations further includes acquiring an instruction from the person, and
causing the display to display the code in response to the instruction.

(Supplementary Note 8)
The accounting system according to any one of supplementary notes 1 to 7, in which
the first operations further includes
causing the display to display the code of one eye in a case where the first camera images a one-eye iris image and causing the display to display the code of both eyes in a case where the first camera images a both-eye iris image,
the second operations further includes
acquiring the accounting information that is at least partially different from the accounting information acquired in a case where the second camera images the code of one eye, in a case where the second camera images the code of both eyes.

(Supplementary Note 9)
The accounting system according to supplementary note 8, in which
the first operations further includes
causing the display to display the code of a left eye in a case where the first camera images an iris image of the left eye and causing the display to display the code of a right eye in a case where the first camera images an iris image of the right eye, and
the second operations further includes
acquiring the accounting information that is at least partially different from the accounting information acquired in a case where the second camera images the code of the right eye, in a case where the second camera images the code of the left eye.

(Supplementary Note 10)
The accounting system according to any one of supplementary notes 1 to 9, in which
the code is a one-dimensional code or a two-dimensional code.

(Supplementary Note 11)
The accounting system according to any one of supplementary notes 1 to 10, further including:
an information providing device configured to
provide the code to the information display device based on an image of the physical characteristics peculiar to the person and received from the information display device and
provide the accounting information to the information processing device based on the code received from the information processing device.

(Supplementary Note 12)
The accounting system according to any one of supplementary notes 1 to 11, in which
an information amount of the code is less than an information amount of the image of the physical characteristics peculiar to the person.

(Supplementary Note 13)
An information display device including:
a memory; and
at least one processor coupled to the memory,
the processor performing operations, the operations includes:
causing a first camera to image a person; and
causing a display to display a code based on physical characteristics peculiar to the imaged person as the code to be imaged by an information processing device that
causes a second camera to image the code,
acquires accounting information of the person using the imaged code, and
executes accounting processing using the accounting information.

(Supplementary Note 14)
An information processing device including:
a memory; and
at least one processor coupled to the memory,
the processor performing operations, the operations includes:
causing a second camera to image a code displayed by an information display device that causes a first camera to image a person and causes a display to display the code based on physical characteristics peculiar to the imaged person;

acquiring accounting information of the person using the imaged code; and
executing accounting processing using the accounting information.
(Supplementary Note 15)
An accounting processing method, in which
in an accounting system,
an information display device
causes a first camera to image a person and
causes a display to display a code based on physical characteristics peculiar to the imaged person, and
an information processing device
causes a second camera to image the code displayed by the information display device,
acquires accounting information of the person using the imaged code, and
executes accounting processing using the accounting information.
(Supplementary Note 16)
An accounting processing method, in which
an information display device
causes a first camera to image a person, and
causes a display to display a code based on physical characteristics peculiar to the imaged person as the code to be imaged by an information processing device that causes a second camera to image the code, acquires accounting information of the person using the imaged code, and executes accounting processing using the accounting information.
(Supplementary Note 17)
An accounting processing method, in which
an information processing device
causes a second camera to image a code displayed by an information display device that causes a first camera to image a person and causes a display to display the code based on physical characteristics peculiar to the imaged person,
acquires accounting information of the person using the imaged code, and
executes accounting processing using the accounting information.
(Supplementary Note 18)
A non-transitory computer-readable recording medium that embodies a program. The program causing causes
an information display device to perform a method. The method includes
causing a first camera to image a person, and
causing a display to display a code based on physical characteristics peculiar to the person as the code to be imaged by an information processing device that causes a second camera to image the code, acquires accounting information of the person using the imaged code, and executes accounting processing using the accounting information.
(Supplementary Note 19)
A non-transitory computer-readable recording medium that embodies a program. The program causes
an information processing device to perform a method. The method includes
causing a second camera to image a code displayed by an information display device that causes a first camera to image a person and causes a display to display the code based on physical characteristics peculiar to the imaged person,
acquiring accounting information of the person using the imaged code, and
accounting processing using the accounting information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used in a facility that includes a plurality of shops such as a shopping mall, a shop that needs different totaling such as duty-free goods and dutiable goods, or the like.

REFERENCE SIGNS LIST 100 information display device
101 information display device
102 information display device
103 information display device
104 information display device
110 imaging unit
120 code acquisition unit
121 code acquisition unit
130 code display unit
140 code storage unit
150 instruction acquisition unit
160 code generation unit
170 ID acquisition unit
200 information processing device
210 imaging unit
220 accounting information acquisition unit
230 accounting processing unit
300 information providing device
301 information providing device
302 information providing device
303 information providing device
310 information storage unit
311 information storage unit
312 information storage unit
313 information storage unit
320 information providing unit
321 information providing unit
322 information providing unit
323 information providing unit
400 accounting system
401 accounting system
402 accounting system
403 accounting system
404 accounting system
600 information processing device
610 CPU
620 ROM
630 RAM
640 internal storage device
650 IOC
660 input device
670 display device
680 NIC
700 recording medium

What is claimed is:
1. An accounting system comprising:
a first information display device including
a first memory;
at least one first processor coupled to the first memory;
a first camera; and a display, wherein
the first processor performs first operations, the first operations comprising:
instructing the first camera to obtain an image of a person by imaging the person; and
instructing the display to display a code, and
the first camera is instructed by the first processor to image the person, and
the display is instructed by the first processor to display the code based on physical characteristics peculiar to the image of the person, wherein the display displays the code of one eye in a case where the first camera images a one-eye iris image, and displays the code of both eyes in a case where the first camera images a both-eye iris image; and
a second information processing device including
a second memory; and
at least one second processor coupled to the second memory; and
a second camera, wherein
the second camera is instructed by the second processor to image the code displayed by the display of the information display device, and,
the second processor performs second operations, the second operations comprising:
instructing the second camera to image the code displayed by the display of the information display device;
acquiring accounting information of the person by using the imaged code, wherein the accounting information has a higher usage limit than the accounting information acquired in a case where the second camera images the code of one eye, in a case where the second camera images the code of both eyes; and
executing accounting processing by using the accounting information.

2. The accounting system accounting to claim 1, wherein the first operations further comprise
storing the code, and
causing the display to display the stored code in response to an instruction.

3. The accounting system according to claim 1, wherein the first operations further comprise
generating the code based on the imaged physical characteristics, and
causing the display to display the generated code.

4. The accounting system according to claim 3, wherein the first information display device is provided at an entrance of a facility.

5. The accounting system according to claim 1, wherein the first operations further comprise
acquiring an identifier of the person by using the imaged physical characteristics, and
causing the display to display the code by using the acquired identifier.

6. The accounting system according to claim 5, wherein the code includes at least a part of the identifier.

7. The accounting system according to claim 1, wherein the first operations further comprise
acquiring an instruction from the person, and
causing the display to display the code in response to the instruction.

8. The accounting system according to claim 1, wherein the first operations further comprise
casing the display to display the code of a left eye in a case where the first camera images an iris image of the left eye and causing the display to display the code of a right eye in a case where the first camera images an iris image of the right eye, and
the second operations further comprise
acquiring the accounting information that is at least partially different from the accounting information acquired in a case where the second camera images the code of the right eye, in a case where the second camera images the code of the left eye.

9. The accounting system according to claim 1, wherein the code is a one-dimensional code or a two-dimensional code.

10. The accounting system according to claim 1, further comprising:
an information providing device configured to
provide the code to the second information display device based on an image of the physical characteristics received from the information display device and
provide the accounting information to the information processing device based on the code received from the information processing device.

11. The accounting system according to claim 1, wherein an information amount of the code is less than an information amount of the image of the physical characteristics.

12. An accounting processing method comprising:
in an accounting system,
by a first processor of a first information display device,
instructing a first camera to obtain an image of a person by imaging the person, and
instructing a display to display a code based on physical characteristics peculiar to the image of the person, wherein the display displays the code of one eye in a case where the first camera images a one-eye iris image, and displays the code of both eyes in a case where the first camera images a both-eye iris image; and
by a second processor of a second information processing device,
instructing a second camera to image the code displayed by the first information display device,
acquiring accounting information of the person by using the imaged code, wherein the accounting information has a higher usage limit that the accounting information acquired in a case were the second camera images the code of one eye, in a case where the second camera images the code of both eyes; and
executing accounting processing by using the accounting information.

13. A non-transitory computer-readable recording medium embodying a program, the program causing an information display device to perform a method, the method comprising:
instructing a first camera to obtain an image of a person by imaging the person; and
instructing a display to display a code based on physical characteristics peculiar to the image of the person, wherein the display displays the code of one eye in a case where the first camera images a one-eye iris image, and displays the code of both eyes in a case where the first camera images a both-eye iris image; wherein the code instructs:
instructing a second camera to image the code,
acquiring accounting information of the person by using the imaged code, wherein the accounting information has a higher usage limit that the accounting information acquired in a case were the second camera images the code of one eye, in a case where the second camera images the code of both eyes, and executing accounting processing by using the accounting information.

* * * * *